United States Patent
Yun et al.

(10) Patent No.: US 9,690,730 B2
(45) Date of Patent: Jun. 27, 2017

(54) REGISTER SLICING CIRCUIT AND SYSTEM ON CHIP INCLUDING THE SAME

(71) Applicant: SAMSUNG ELECTRONICS CO., LTD., Suwon-si, Gyeonggi-do (KR)

(72) Inventors: Jae-Geun Yun, Hwaseong-si (KR); Sung-Hoon Shim, Seongnam-si (KR); Bub-Chul Cheong, Yongin-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 748 days.

(21) Appl. No.: 14/077,282

(22) Filed: Nov. 12, 2013

(65) Prior Publication Data
US 2014/0143462 A1   May 22, 2014

(30) Foreign Application Priority Data
Nov. 22, 2012 (KR) ........................ 10-2012-0132818

(51) Int. Cl.
   *G06F 13/362* (2006.01)
   *G06F 13/36* (2006.01)

(52) U.S. Cl.
   CPC ............ *G06F 13/362* (2013.01); *G06F 13/36* (2013.01)

(58) Field of Classification Search
   CPC .............................. G06F 13/362; G06F 13/36
   See application file for complete search history.

(56) References Cited

U.S. PATENT DOCUMENTS

| | | | |
|---|---|---|---|
| 6,292,856 B1 * | 9/2001 | Marcotte | G06F 13/102 710/263 |
| 6,505,260 B2 | 1/2003 | Chin et al. | |
| 7,117,277 B2 * | 10/2006 | Mathewson | G06F 15/7867 710/52 |
| 7,149,828 B2 | 12/2006 | Hayashi et al. | |
| 7,721,039 B2 * | 5/2010 | Irisa | G06F 13/364 710/243 |
| 7,769,027 B2 | 8/2010 | Douady et al. | |
| 7,801,903 B2 | 9/2010 | Furusho | |
| 7,844,793 B2 | 11/2010 | Herger et al. | |
| 8,032,561 B1 | 10/2011 | Nadj et al. | |
| 8,103,859 B2 | 1/2012 | Kiyota | |
| 2004/0068603 A1 * | 4/2004 | Augsburg | G06F 13/362 710/310 |
| 2004/0186941 A1 * | 9/2004 | Peng | G06F 13/4265 710/312 |
| 2008/0263556 A1 | 10/2008 | Zoll et al. | |
| 2009/0300382 A1 * | 12/2009 | Bruce | G06F 1/32 713/310 |

(Continued)

FOREIGN PATENT DOCUMENTS

| | | |
|---|---|---|
| JP | 2009211604 | 9/2009 |
| KR | 20100006578 A | 1/2010 |
| KR | 20110070656 A | 6/2011 |

*Primary Examiner* — Nimesh G Patel
(74) *Attorney, Agent, or Firm* — Volentine & Whitt, PLLC

(57) ABSTRACT

A register slicing circuit includes first and second register circuits, a forward channel and a backward channel. The first and second register circuits sequentially store requests received from a plurality of master devices to output the stored requests toward a slave device. The forward channel is used for sending a first request from the first register circuit to the second register circuit, and the backward channel is used for sending back a second request from the second register circuit to the first register circuit.

17 Claims, 18 Drawing Sheets

(56) References Cited

U.S. PATENT DOCUMENTS

| | | |
|---|---|---|
| 2011/0035537 A1 | 2/2011 | Kwon |
| 2011/0153710 A1 | 6/2011 | Baek et al. |
| 2011/0179222 A1 | 7/2011 | Iwasaki et al. |
| 2012/0303849 A1* | 11/2012 | Xia .................. G06F 13/38 710/110 |
| 2016/0162425 A1* | 6/2016 | Accapadi ............. G06F 13/362 710/111 |

* cited by examiner

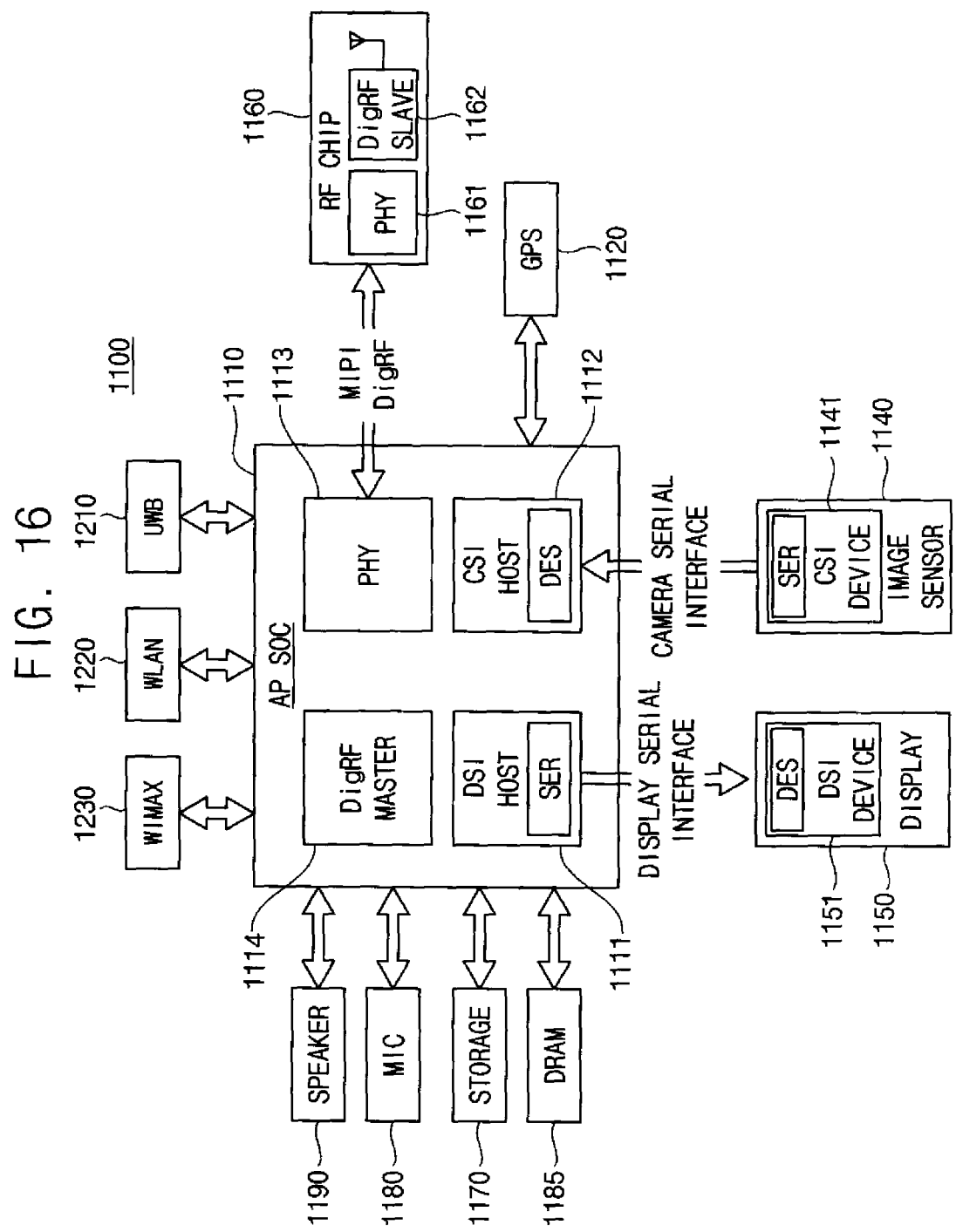

REGISTER SLICING CIRCUIT AND SYSTEM ON CHIP INCLUDING THE SAME

CROSS-REFERENCE TO RELATED APPLICATION

This U.S. non-provisional patent application claims priority under 35 USC §119 to Korean Patent Application No. 10-2012-0132818, filed on Nov. 22, 2012, in the Korean Intellectual Property Office (KIPO), the disclosure of which is incorporated by reference in its entirety herein.

BACKGROUND

1. Technical Field

Example embodiments of the inventive concept relate generally to semiconductor integrated circuits and, more particularly, to a register slicing circuit and a system on chip (SOC) to expedite flows of urgent requests.

2. Discussion of the Related Art

An SOC indicates a chip, or a system on chip in which various semiconductor components are integrated together. The recent market trend is away from application specific integrated circuits (ASICs) and application specific standard products (ASSPs), toward SOC technologies. Further, there is an increasing demand for reducing the size and increasing the performance level of the SOC. While the integration degree of the SOC may be increased by integrating additional components into one chip, an operational speed of the SOC may not increase sufficiently.

SUMMARY

At least one example embodiment of the inventive concept provides a register slicing circuit capable of efficiently controlling request flows of an entire system by expediting flows of urgent requests.

At least one example embodiment of the inventive concept provides a SOC including a register slicing circuit capable of efficiently controlling request flows of the SOC by expediting flows of urgent requests.

According to an example embodiment of the inventive concept, a register slicing circuit includes first and second register circuits, a forward channel and a backward channel. The first and second register circuits sequentially store requests received from a plurality of master devices to output the stored requests toward a slave device. The forward channel is used for sending a first request from the first register circuit to the second register circuit, and the backward channel is used for sending back a second request from the second register circuit to the first register circuit.

A number of signal lines in the backward channel for sending back the second request may be less than a number of signal lines in the forward channel for sending the first request.

The second register circuit may divide the second request into a plurality of segments and send back the segments sequentially through the backward channel to the first register circuit.

The requests may each include a corresponding urgent flag, and each urgent flag may indicate whether or not an urgent service of the corresponding request is required such that a request having the urgent flag of a first value corresponds to an urgent request and a request having the urgent flag of a second value corresponds to a normal request.

The first register circuit and the second register circuit may perform an inter-node swapping operation based on the urgent flags for exchanging the first request and the second request.

The inter-node swapping operation may be performed when both: the second register circuit is in an issue-full state in which the second register circuit stores a maximum number of the requests; and the first request corresponds to an urgent request.

The first register circuit and the second register circuit may cancel the inter-node swapping operation when the second register circuit is relieved from the issue-full state before the inter-node swapping operation is completed.

Each of the first register circuit and the second register circuit may perform an in-node swapping operation based on the urgent flags for exchanging a storing order of two requests adjacently stored in each of the first register circuit and the second register circuit such that an urgent request stored later is exchanged with a normal request stored earlier.

The requests may further each include an order-dependency flag, and the order-dependency flags may indicate a limitation of a service order between two or more requests. Each of the first register circuit and the second register circuit may determine, based on the order-dependency flags, a group of the requests the service order of which is limited within the group. When the group includes an urgent request stored later and a normal request stored earlier, each of the first register circuit and the second register circuit may change the urgent flag of the normal request stored earlier from the second value to the first value.

Each of the first register circuit and the second register circuit may include a request buffer configured to store the requests, a backward buffer configured to temporarily store the second request to be sent back during the inter-node swapping operation, and a control unit configured to control the request buffer and the backward buffer.

The control unit of the second register circuit may provide a full count signal to the first register circuit, and the full count signal may indicate an issue-full state in which the second register circuit stores a maximum number of the requests. The control unit of the first register circuit may whether to perform the inter-node swapping operation based on the full count signal from the second register circuit and the urgent flag in the first request.

According to an example embodiment of the inventive concept, a system on chip (SOC) includes a slave device, a plurality of master devices configured to generate requests to demand services from the slave device, respectively, and an interconnect device coupling the slave device and the master devices. The interconnect device includes first and second register circuits configured to sequentially store the requests received from the master devices to output the stored requests toward the slave device, a forward channel configured to send a first request from the first register circuit to the second register circuit, and a backward channel configured to send back a second request from the second register circuit to the first register circuit.

The requests may each include a corresponding urgent flag, and each urgent flag may indicate whether or not an urgent service of the corresponding request is required such that a request having the urgent flag of a first value corresponds to an urgent request and a request having the urgent flag of a second value corresponds to a normal request.

The first register circuit and the second register circuit may perform an inter-node swapping operation and an in-node swapping operation based on the urgent flags, and the inter-node swapping operation may be for exchanging the first request and the second request. Also the first register circuit and the second register circuit may perform the in-node swapping operation for exchanging a storing order of two requests adjacently stored in each of the first register circuit and the second register circuit such that an urgent request stored later is exchanged with a normal request stored earlier.

Urgent information indicating requirements of the urgent services of the respective requests may be provided in real time from the master devices to the first register circuit and the second register circuit, and the values of the urgent flags in the request stored in the first register circuit and the second register circuit may be upgraded in real time based on the urgent information.

According to yet another example embodiment of the inventive concept, a device, includes: a first register circuit having a first request buffer comprising a first plurality of storage units connected together in a shift register configuration, the first plurality of storage units being configured to store therein a plurality of requests, including requests having at least two different levels of urgency than each other; and a second register circuit connected to the first register circuit by a forward channel which is configured to send the requests from the first register circuit to the second register circuit, and a backward channel which is configured to send the requests from the second register circuit back to the second register circuit. The second register circuit includes: a second request buffer comprising a second plurality of storage units connected together in the shift register configuration, the second plurality of storage units being configured to receive the requests from the first register circuit via the forward channel and to store the requests therein, including the requests having the at least two different levels of urgency; a backward buffer configured to receive and temporarily store at least one of the requests from the second plurality of storage units to be sent back to the first resister circuit via the backward channel; and a control unit configured to control operations of the second register circuit.

The control unit may be configured to control the second register circuit to divide each of at least one of the requests stored in the backward buffer into a plurality of segments and to send back the segments sequentially through the backward channel to the first register circuit.

The requests may each include a corresponding urgent flag, each urgent flag indicating an urgency of the corresponding request, wherein the urgent flag having a first value indicates an urgent request and the urgent flag having a second value indicates a normal request, and the device may be configured to perform an inter-node swapping operation based on the urgent flags for exchanging an urgent request stored in the first plurality of storage units of the first register circuit with a normal request stored in the second plurality of storage units of the second register circuit by sending the normal request from the backward buffer of the second register circuit to the first register circuit via the backward channel.

The inter-node swapping operation may be performed when both: the second register circuit is in an issue-full state in which the second register circuit stores a maximum number of the requests; and the urgent request is stored in the first plurality of storage units.

BRIEF DESCRIPTION OF THE DRAWINGS

Example embodiments of the inventive concept will be more clearly understood from the following detailed description taken in conjunction with the accompanying drawings.

FIG. 16 is a block diagram illustrating an interface employable in the computing system of FIG. 15 according to an example embodiment of the inventive concept.

DETAILED DESCRIPTION OF THE EMBODIMENTS

Figure 1:
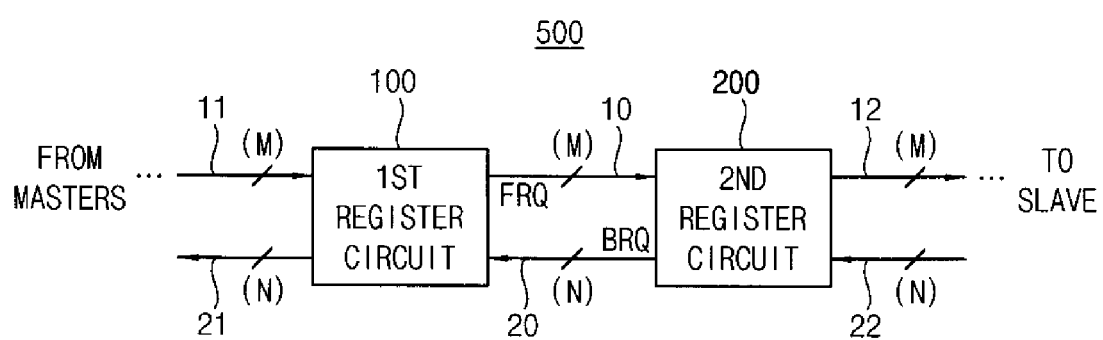
FIG. 1 is a diagram illustrating a register slicing circuit according to example embodiments of the inventive concept.

Various example embodiments will be described more fully hereinafter with reference to the accompanying drawings, in which some example embodiments are shown. The present inventive concept may, however, be embodied in many different forms and should not be construed as limited to the example embodiments set forth herein. Rather, these example embodiments are provided so that this disclosure will be thorough and complete, and will fully convey the scope of the present inventive concept to those skilled in the art. In the drawings, the sizes and relative sizes of layers and regions may be exaggerated for clarity. Like numerals refer to like elements throughout.

It will be understood that, although the terms first, second, third etc. may be used herein to describe various elements, these elements should not be limited by these terms. These terms are used to distinguish one element from another. Thus, a first element discussed below could be termed a second element without departing from the teachings of the present inventive concept. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular example embodiments only and is not intended to be limiting of the present inventive concept. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a diagram illustrating a register slicing circuit according to example embodiments of the inventive concept.

Referring to FIG. 1, a register slicing circuit 500 includes a first register circuit 100, a second register circuit 200, a forward channel 10 and a backward channel 20.

First and second register circuits 100 and 200 sequentially store requests received from a plurality of master devices, or master intellectual property cores or blocks (IPs), to output the stored requests toward a slave device or a slave IP. Forward channel 10 is a channel for sending a first request FRQ from first register circuit 100 to second register circuit 200. Backward channel 20 is a channel for sending back a second request BRQ from second register circuit 200 to first register circuit 100.

To support high-performance applications in mobile devices for wireless internet, broadcasting, multimedia, etc., an operational frequency of an on-chip bus or an interconnect device in a system on chip (SOC) is ever-increasing. As various devices or IPs are included in the SOC, design margin may be decreased and a distance between network nodes or slicing nodes for timing closure may be increased. Because the signal transfer time is increased as the distance between the network nodes is increased, the long distance between the network nodes limits the increase of the operational frequency. To solve such problems, the advanced extensible interface (AXI) protocol or the open core protocol (OCP) specifies that at least one register slice or register point may be inserted between the long-distance network nodes.

Figure 11:
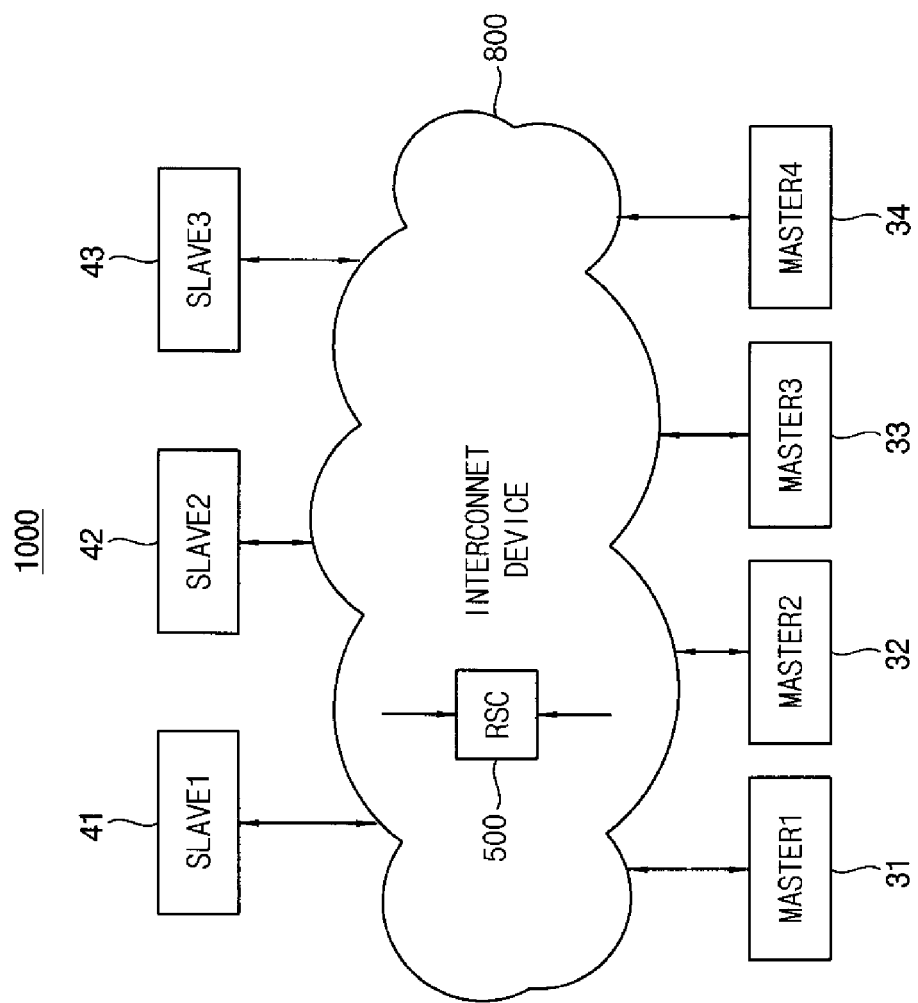
FIG. 11 is a diagram illustrating a system on chip (SOC) according to example embodiments of the inventive concept.

Register slicing circuit 500 of FIG. 1 may be used for the register slicing according to the AXI protocol or the OCP, and register slicing circuit 500 may be inserted in an arbitrary path in an interconnect device 800 as illustrated in FIG. 11. In particular, register slicing circuit 500 may be inserted in a time-critical portion of a channel between the master devices and the slave device.

The conventional register slicing circuit includes only the forward channel for transferring the requests from the master devices toward the slave device. In this case, the flow of an urgent request may be retarded when the latter register circuit is in an issue-full state in which the latter register circuit stores a maximum number of the requests, because the urgent request cannot be transferred from the former register circuit to the latter register circuit in the issue-full state. As an example to solve this problem, the flow of the normal requests blocking the urgent request in a link may be expedited. In this case, however, starvation of another link may be caused due to the excessive flow of the link including the urgent request. As another solution, a plurality of request buffers may be included in one network node to store the respective requests divided by priority, and transfer first the requests of higher priority. In this case, however, gate-count overhead is increased due to the large number of request buffers.

Register slicing circuit 500 according to example embodiments further includes the backward channel 20 for performing an inter-node swapping operation so that an urgent request in first register circuit 100 may be transferred to second register circuit 200 even though the second register 200 is in the issue-full state.

In an example embodiment, a number N of signal lines in backward channel 20 for sending back the second request BRQ is less than a number M of signal lines in forward channel 10 for sending the first request FRQ. The time for the inter-node swapping operation may be increased as the number N of the signal lines in backward channel 20 is decreased, and thus the number N may be determined properly considering the time for the inter-node swapping operation and the design margin of the system adopting register slicing circuit 500.

As such, the register slicing circuit 500 according to example embodiments may expedite the flow of the urgent request by performing the inter-node swapping operation using backward channel 20 implemented with the proper number N of the signal lines.

Even though FIG. 1 illustrates two register circuits 100 and 200 for convenience of illustration, register slicing circuit 500 may include three or more register circuits that are cascade-coupled. For example, first register circuit 100 may perform the inter-node swapping operation with a register circuit (not shown) before first register circuit 100 using a forward channel 11 and a backward channel 21, and/or second register circuit 200 may perform the inter-node swapping operation with a register circuit (not shown) after second register circuit 200 using a forward channel 12 and a backward channel 22.

Figure 2:
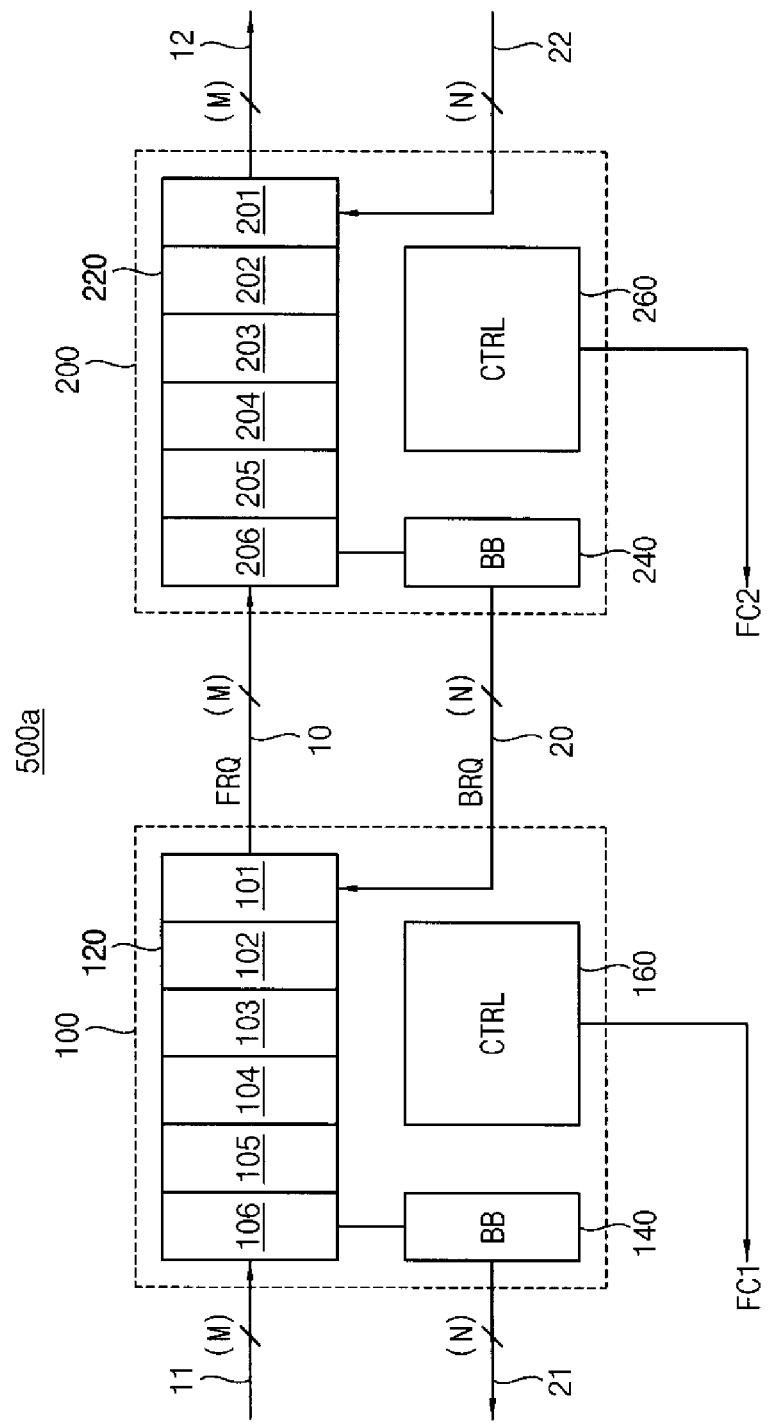
FIG. 2 is a block diagram illustrating a register slicing circuit according to an example embodiment of the inventive concept.

FIG. 2 is a block diagram illustrating a register slicing circuit according to an example embodiment of the inventive concept.

Referring to FIG. 2, a register slicing circuit 500a may include first register circuit 100, second register circuit 200, forward channel 10 and backward channel 20, and first and second register circuits 100 and 200 may include request buffers 120 and 220, backward buffers (BBs) 140 and 240 and control units (CTRLs) 160 and 260, respectively.

Request buffers 120 and 220 store the requests transferred from the preceding node and backward buffers 140 and 240 temporarily store the request to be sent back to the preceding node during the inter-node swapping operation. Control units 160 and 260 control request buffers 120 and 220 and backward buffers 140 and 240, respectively.

As described above, first register circuit 100 may perform the inter-node swapping operation with a register circuit (not shown) before first register circuit 100. If first register circuit 100 does not perform the inter-node swapping operation with the preceding register circuit, backward buffer 140 and backward channel 21 illustrated in FIG. 2 may be omitted. Similarly second register circuit 200 may perform the inter-node swapping operation with a register circuit (not shown) after second register circuit 200. If second register circuit 200 does not perform the inter-node swapping operation with the next register circuit, backward channel 22 illustrated in FIG. 2 may be omitted.

Hereinafter, the inter-node swapping operation is described between first register circuit 100 and second register circuit 200. The inter-node operation between first register circuit 100 and the preceding node, or between second register circuit 200 and the next node, may be similar to the inter-node swapping operation between first register circuit 100 and second register circuit 200.

First request buffer 120 in first register circuit 100 may include a plurality of storage units 101 through 106, and second request buffer 220 in second register circuit 200 may include a plurality of storage units 201 through 206. FIG. 2 illustrates for convenience of description that each of first and second request buffers 120 and 220 includes the six storage units, but the number of the storage units in each request buffer may be changed to a different number. The first request buffer 120 and second request buffer 220 may include the same number, or different numbers, of the storage units.

Request buffers 120 and 140 may perform fundamentally a shifting operation similar to a shift register and an input-output operation according to a first-in first out (FIFO) scheme when the expedition of an urgent request is not required.

First request buffer 120 may store the requests from the preceding node sequentially in first storage unit 101 through sixth storage unit 106. Control unit 160 may activate a full count signal FC1 when a request is stored in the last storage unit, that is, sixth storage unit 106 (e.g., when all of storage units 101-106 are occupied with requests). The full count signal FC1 may be provided to the preceding node to provide the occupancy state of first request buffer 120. First request buffer 120 may transfer the request stored in first storage unit 101 as the first request FRQ to second register circuit 200 through forward channel 10. Whenever one request is transferred to second register circuit 200, the requests in first request buffer 120 may be shifted sequentially unit by unit. In other words, the request in second storage unit 102 may move to first storage unit 101, the request in third storage unit 103 may move to second storage unit 102, and so on. Through such shifting operation, the FIFO input-output operation may be performed such that the request stored earlier may be output earlier.

The shifting operation and the FIFO input-output operation may be limited during an in-node swapping operation and an inter-node swapping operation. As described in greater detail below with reference to FIGS. 5A through 5B, the shifting operation of first request buffer 120 may be limited in case of the inter-node swapping operation because the second request BRQ sent back from second register circuit 200 is stored in first storage unit 101. As described in greater detail below with reference to FIG. 7, the FIFO input-output operation may be limited in case of the in-node swapping operation because the storing order of the requests may be swapped such that an urgent request stored later may be output earlier than a normal request stored earlier.

Second request buffer 220 may store the requests from first register circuit 100 sequentially in first storage unit 201 through sixth storage unit 206. Control unit 260 may activate a full count signal FC2 when the request is stored in the last storage unit, that is, sixth storage unit 206 (e.g., when all of storage units 201-206 are occupied with requests). The full count signal FC2 may be provided to first register circuit 100 to provide the occupancy state of second request buffer 220.

The first register circuit 100 and the second register circuit 200 may perform an inter-node swapping operation for exchanging the first request FRQ and the second request BRQ. The inter-node swapping operation may be performed when the second register circuit 200 is in an issue-full state in which second register circuit 200 stores a maximum number of requests (e.g., six requests) and when the first request FRQ corresponds to an urgent request. For the inter-node swapping operation, the request stored in sixth storage unit 206 of second request buffer 220 is moved to backward buffer 240 and then first request FRQ from first register circuit 100 may be stored in sixth storage unit 206 of second request buffer 220. The request temporarily stored in backward buffer 240 may be sent back as the second request BRQ through backward channel 20 and then stored in first storage unit 101 of first request buffer 120.

Figure 3:
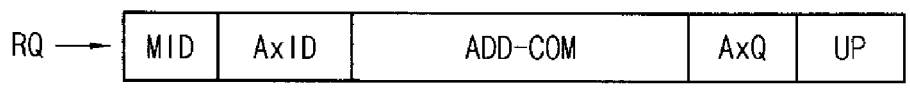
FIG. 3 is a diagram illustrating an example structure of requests stored in a register slicing circuit according to an example embodiment of the inventive concept.

FIG. 3 is a diagram illustrating an example structure of requests stored in a register slicing circuit according to an example embodiment of the inventive concept.

Referring to FIG. 3, the respective requests RQ, which are stored in request buffers 120 and 220 and transferred through forward and backward channels 10 and 20, may include a master identifier MID indicating the master device that issued the request RQ, a request identifier AxID for distinguishing the request RQ from the other requests from the same master device, an address-command ADD-COM representing the contents of the request RQ, a priority AxQ of the request RQ, and an urgent flag UP.

The urgent flag UP indicates whether an urgent service of the corresponding request RQ is required or not, such that the request having the flag of a first value (e.g., "1") corresponds to an urgent request and the request having the flag of a second value (e.g., "0") corresponds to a normal request. The urgent flag UP may include only one bit for representing whether the request RQ is the urgent request or not, or the urgent flag UP may include a plurality of bits for representing a degree of the urgency.

The request identifier AxID may represent a group of the requests that have a certain correlation. For example, the correlation may be a limit to a service order between the requests in the group. The limit to the service order may be a restriction that the request issued earlier has to be serviced earlier than the request issued later. The order-dependency flag OD, which will be described in greater detail below with reference to FIGS. 10A through 10F, may be a value based on the request identifier AxID.

Figure 4A:
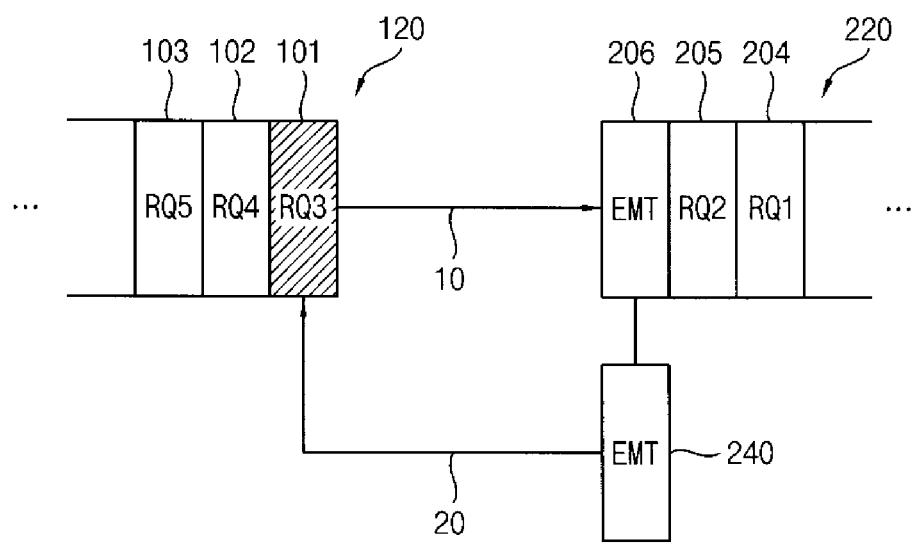
FIGS. 4A and 4B are diagrams for describing a normal inter-node transfer of a register slicing circuit according to an example embodiment of the inventive concept.
Figure 4B:
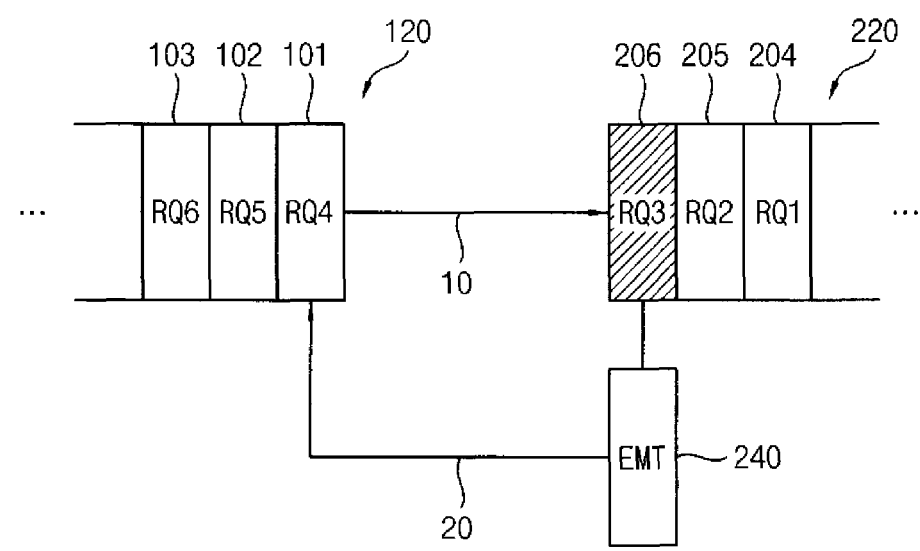

FIGS. 4A and 4B are diagrams for describing a normal inter-node transfer of a register slicing circuit according to an example embodiment of the inventive concept.

For convenience of illustration, FIGS. 4A and 4B illustrate only some storage units 101, 102 and 103 in first request buffer 120 and some storage units 204, 205 and 206 in second request buffer 220. EMT represents an empty state or a non-occupied state in FIGS. 4A and 4B, for example, that a valid request is not stored in backward buffer 240 or storage unit 206.

FIG. 4A represents the states of request buffers 120 and 220 and backward buffer 240 before the normal inter-node transfer of the request RQ3, and FIG. 4B represents the states of request buffers 120 and 200 and backward buffer 240 after the normal inter-node transfer of the request RQ3. As illustrated in FIG. 4A, second request buffer 220 is not in the issue-full state because sixth storage unit 206 is in the non-occupied state EMT.

The inter-node swapping operation is not required when second request buffer 220 is not in the issue-full state, and thus the normal inter-node transfer is performed such that the request RQ3 in first storage unit 101 in first request buffer 120 is transferred through the forward channel 10 and then stored in sixth storage unit 206 of second request buffer 220. As the one request RQ3 is output, the other requests RQ4, RQ5 and RQ6 are shifted forward unit by unit.

Such normal inter-node transfer may be performed regardless of the request RQ3 to be transferred being a normal request or a urgent request because second request buffer 220 is not in the issue-full state. Backward channel 20 and backward buffer 240 do not perform any operation and remain disabled in case of the normal inter-node transfer.

FIGS. 5A through 5E are diagrams for describing an inter-node swapping operation of a register slicing circuit according to an example embodiment of the inventive concept.

For convenience of illustration, FIGS. 5A through 5E illustrate only some storage units 101, 102 and 103 in first request buffer 120 and some storage units 204, 205 and 206 in second request buffer 220. EMT represents an empty state or a non-occupied state in FIG. 5A through 5E, for example, that a valid request or a segment of the request is not stored in backward buffer 240 or storage units 101 and 206. It is assumed that the one request RQ4 corresponds to an urgent request and the other requests RQ1, RQ2, RQ3, RQ5 and RQ6 correspond to normal requests.

Figure 5A:
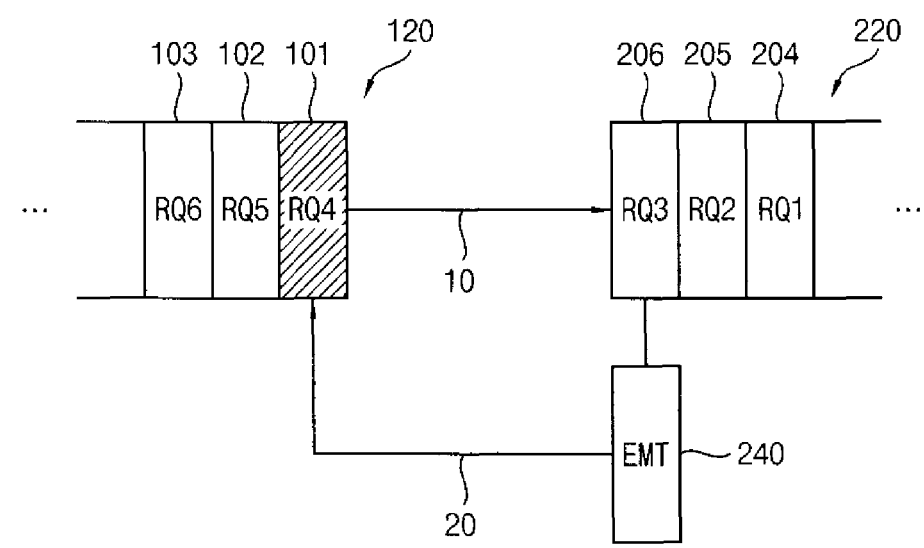
FIGS. 5A through 5E are diagrams for describing an inter-node swapping operation of a register slicing circuit according to an example embodiment of the inventive concept.
Figure 5B:
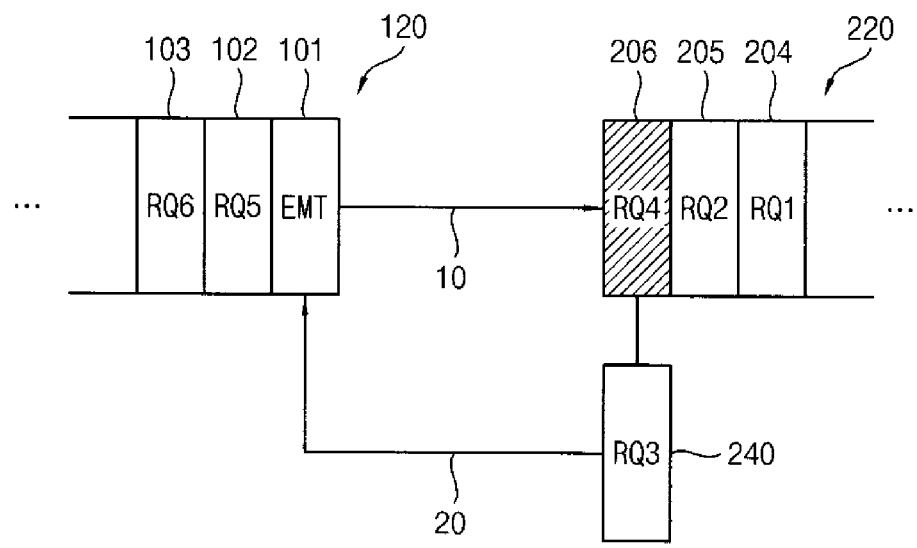

FIGS. 5A through 5B represent the states of request buffers 120 and 220 and the backward buffer 240, which are changed by a unit time interval. For example, the unit time interval may be a cyclic period of an operational clock signal of register slicing circuit 500 of FIG. 1.

Referring to FIG. 5A, the inter-node swapping operation may be performed when second request buffer 220 in second register circuit 200 is in an issue-full state in which second register circuit 200 stores a maximum number of requests (e.g., six requests) and when request RQ4 corresponding to the above-mentioned first request FRQ is an urgent request.

Referring to FIG. 5B, the request RQ3 stored in sixth storage unit 206 of second request buffer 220 is moved to backward buffer 240, and then urgent request RQ4 transferred through forward channel 10 is stored in sixth storage unit 206 of second request buffer 220. First request buffer 120 does not perform the shifting operation during the inter-node swapping operation, even though the one request RQ4 is output and first storage unit 101 of first request buffer 120 maintains the non-occupied state EMT.

Figure 5C:
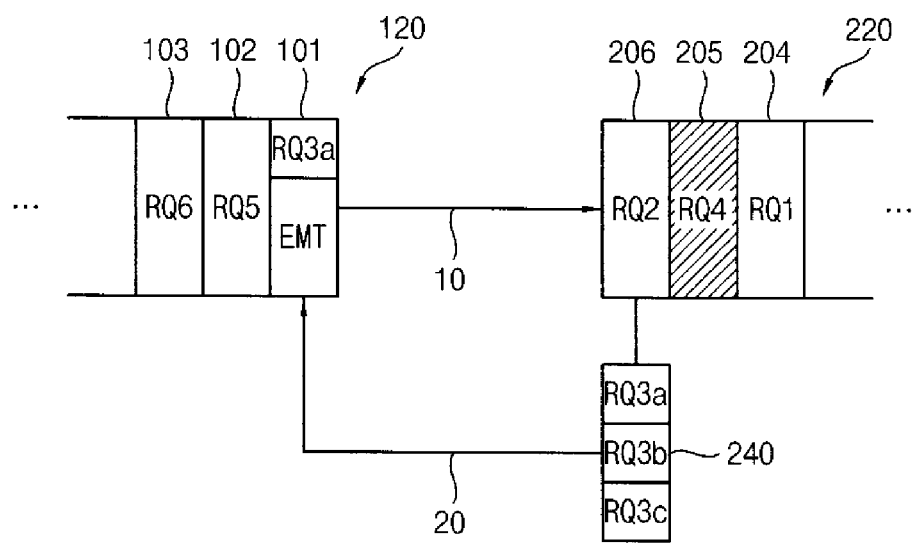
Figure 5D:
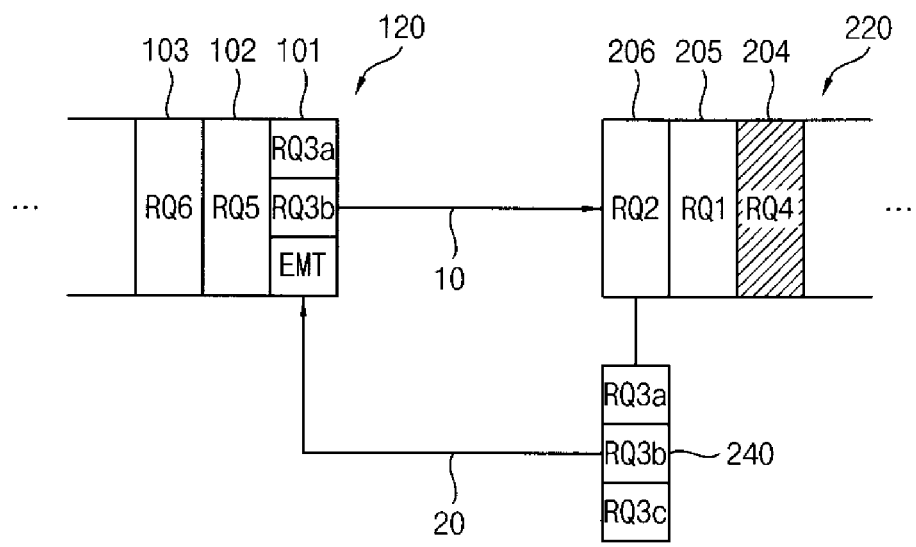
Figure 5E:
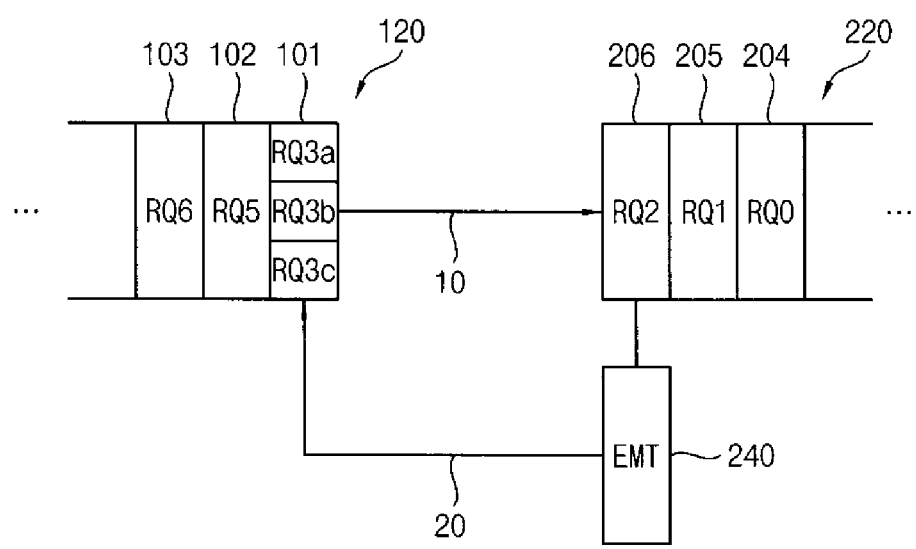

As illustrated in FIGS. 5C, 5D and 5E, second request buffer 120 in second register circuit 200 of FIG. 2 may divide the request RQ3 corresponding to the above-mentioned second request BRQ into a plurality of segments RQ3a, RQ3b and RQ3c, and send back the segments RQ3a, RQ3b and RQ3c sequentially through backward channel 20 to first request buffer 120 in first register circuit 100 of FIG. 2. The division and the backward transfer of the request RQ3 may be performed using backward buffer 240. FIGS. 5C, 5D and 5E illustrate an example wherein the one request RQ3 is divided and sent back as the three segments RQ3a, RQ3b and RQ3c, but the number of the segments may be determined variously in relation with the number of the signal lines in backward channel 20. Adopting the division of the segments, the number of the signal lines for the backward transfer may be reduced and the design burden may be reduced.

In addition, FIGS. 5C, 5D and 5E illustrate that the urgent request RQ4 transferred from first request buffer 120 to second request buffer 220 is swapped sequentially with normal requests RQ2, RQ1 and RQ0 that are stored earlier in second request buffer 220. Such in-node swapping operation is further described in greater detail below with reference to FIG. 7.

Figure 6A:
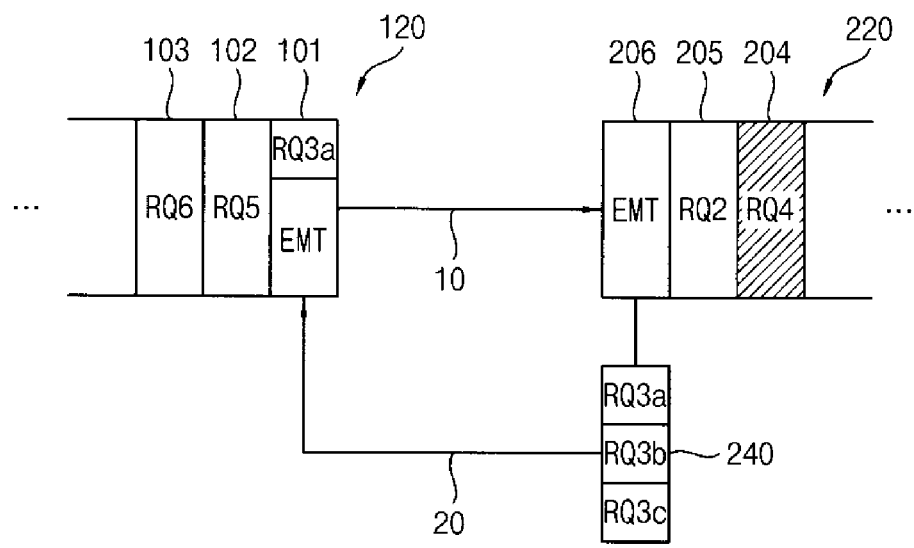
FIGS. 6A and 6B are diagrams for describing canceling of an inter-node swapping operation of a register slicing circuit according to an example embodiment of the inventive concept.
Figure 6B:
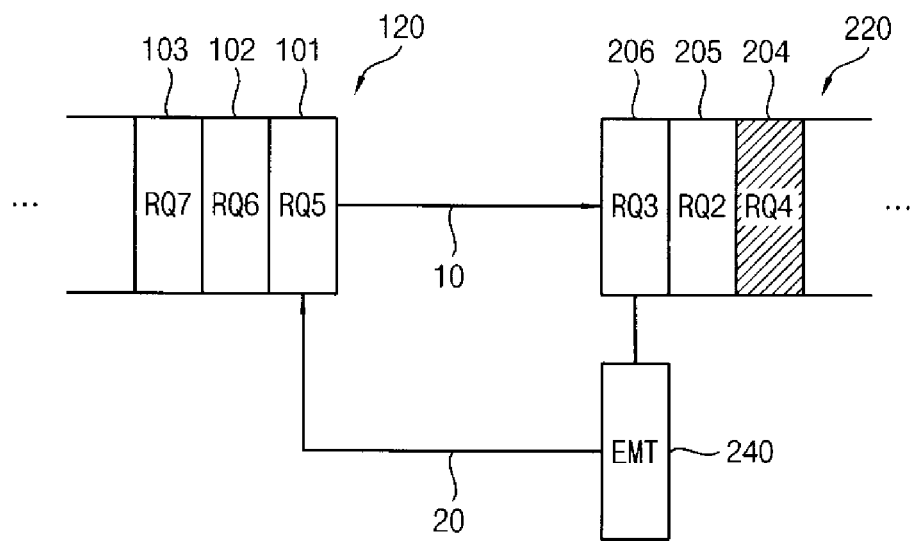

FIGS. 6A and 6B are diagrams for describing canceling of an inter-node swapping operation of a register slicing circuit according to an example embodiment of the inventive concept.

For convenience of illustration, FIGS. 6A and 6B illustrate only some storage units 101, 102 and 103 in first request buffer 120 and some storage units 204, 205 and 206 in second request buffer 220. EMT represents an empty state or a non-occupied state in FIGS. 6A and 6B, for example, that a valid request, or a segment of a request, is not stored in backward buffer 240 or storage units 101 and 206. It is assumed that the one request RQ4 corresponds to an urgent request and the other requests RQ2, RQ3, RQ5 and RQ6 correspond to normal requests.

First register circuit 100 and second register circuit 200 may cancel the inter-node swapping operation, if second request buffer 220 in second register circuit 200 is relieved from the issue-full state before the inter-node swapping operation is completed.

Referring to FIG. 6A, second request buffer 220 may perform the shifting operation and thus sixth storage unit 206 of second request buffer 220 may be in the non-occupied state EMT before all of the segments RQ3a, RQ3b and RQ3c are sent back through backward channel 20. In this case, it is not efficient that the remaining segments RQ3b and RQ3c should be sent back completely through backward channel 20 to first storage unit 101 of first request buffer 120 and then request RQ3 is sent again as the first request FRQ through forward channel 10 to sixth storage unit 206 of second request buffer 220.

Accordingly, referring to FIG. 6A, by cancelling the partially complete inter-node swapping operation, the segment RQ3a already sent back and stored in first storage unit 101 is neglected and first request buffer 120 performs the shifting operation to move the request RQ5, RQ6 and RQ7 forward. Simultaneously the request RQ3 temporarily stored in backward buffer 240 may be restored to the empty sixth storage 206 of second request buffer 220.

Figure 7:
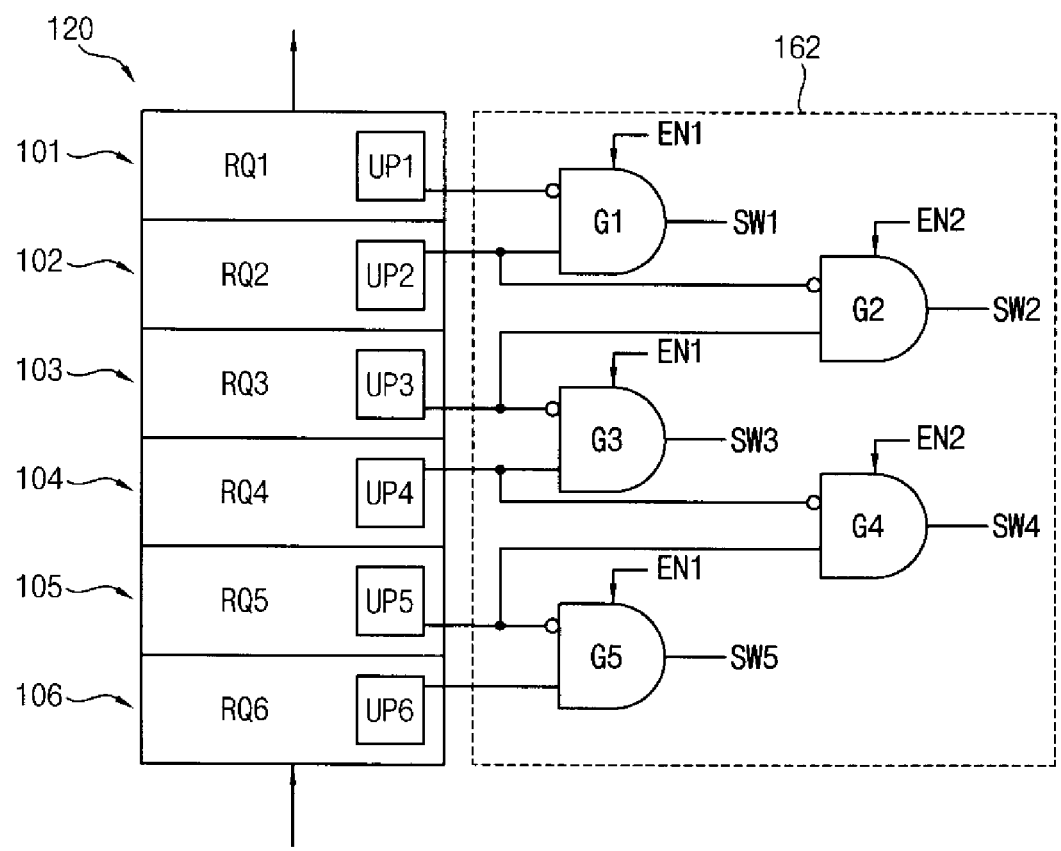
FIG. 7 is a diagram illustrating an example of a first control logic for an in-node swapping operation of a register slicing circuit according to an example embodiment of the inventive concept.

FIG. 7 is a diagram illustrating an example of a first control logic for an in-node swapping operation of a register slicing circuit according to an example embodiment of the inventive concept.

FIG. 7 illustrates first control logic 162 for an in-node swapping operation together with the above-described first request buffer 120 including storage units 101 through 106. First control logic 162 may be included in control unit 160 of first register circuit 100 in FIG. 2. First control logic 162 may include first through fifth logic gates G1 through G5 configured to generate swapping signals SW1 through SW5 based on first through sixth urgent flags UP1 through UP6 respectively included in the requests RQ1 through RQ6.

The first logic gate G1 is enabled in response to a first enable signal EN1 to compare the first urgent flag UP1 and the second urgent flag UP2. The first logic gate G1 may activate the first swapping signal SW1 only when the first urgent flag UP1 has a second value (e.g., "0") indicating that the corresponding request RQ1 is a normal request and the second urgent flag UP2 has a first value (e.g., "1") indicating that the corresponding request RQ2 is an urgent request. When the first swapping signal SW1 is activated, control logic 160 in FIG. 2 may perform the in-node swapping operation for exchanging the normal request RQ1 in first storage unit 101 and the urgent request RQ2 stored in second storage unit 102. In the similar way, an in-node swapping operation may be performed between the request RQ3 in third storage unit 103 and the request RQ4 in fourth storage unit 104 in response to the third swapping signal SW3 generated from third logic gate G3, and an in-node swapping operation may be performed between the request RQ5 in fifth storage unit 105 and the request RQ6 in sixth storage unit 106 in response to the fifth swapping signal SW5 generated from fifth logic gate G3.

Second logic gate G2 is enabled in response to a second enable signal EN2 to compare the second urgent flag UP2 and the third urgent flag UP3. Second logic gate G2 may activate the second swapping signal SW2 only when the second urgent flag UP2 has the second value indicating that the corresponding request RQ2 is a normal request and the third urgent flag UP3 has the first value indicating that the corresponding request RQ3 is an urgent request. When the second swapping signal SW2 is activated, the control logic 160 in FIG. 2 may perform the in-node swapping operation for exchanging the normal request RQ2 in second storage unit 102 and the urgent request RQ3 stored in third storage unit 103. In the similar way, an in-node swapping operation may be performed between the request RQ4 in fourth storage unit 104 and the request RQ5 in fifth storage unit 105 in response to the fourth swapping signal SW4 generated from fourth logic gate G4.

An operational error may be caused when the two adjacent logic gates are enabled simultaneously, because the one request may participate in the two inter-node swapping operations. To prevent this error, the first enable signal EN1 and the second enable signal EN2 may be activated complementarily as illustrated in FIGS. 8A and 8B.

Figure 8A:
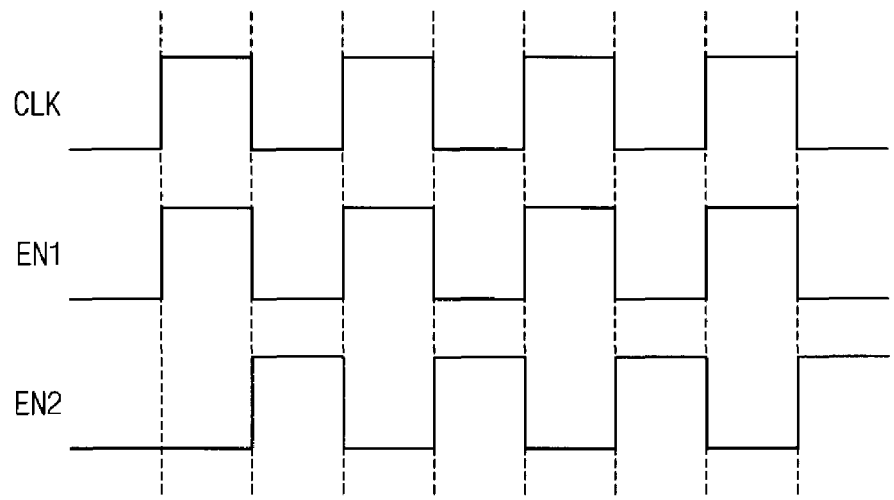
FIGS. 8A and 8B are diagrams illustrating examples of enable signals for the first control logic of FIG. 7.
Figure 8B:
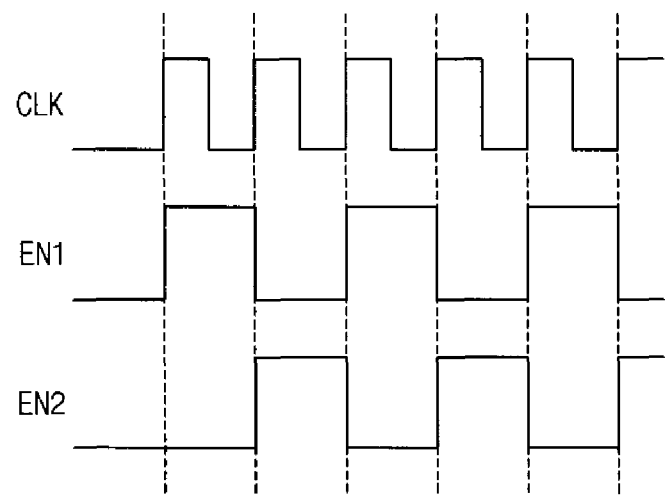

FIGS. 8A and 8B are diagrams illustrating examples of enable signals for first control logic 162 of FIG. 7.

FIG. 8A illustrates an example wherein the first enable signal EN1 and the second enable signal EN2 are activated with the same period as the cyclic period of the clock signal CLK, and FIG. 8B illustrates an example wherein the first enable signal EN1 and the second enable signal EN2 are activated with twice the cyclic period of the clock signal CLK. The first enable signal EN1 and the second enable signal EN2 are complementarily activated in both of FIGS. 8A and 8B. As a result, the swapping operations by the odd-numbered logic gates G1, G3 and G5 and the swapping operations by the even-numbered logic gates G2 and G4 may be performed alternatively and the above-mentioned operational error may be prevented.

As the in-node swapping operation of first register circuit 100 is described with reference FIG. 7, the in-node swapping operation of second register circuit 200 may be performed in the same way. As such, each of first register circuit 100 and second register circuit 200 may perform the in-node swapping operation based on the urgent flags UP1 through UP6 for exchanging a storing order of two requests adjacently stored in each of first register circuit 100 and second register circuit 200 such that an urgent request stored later may be exchanged with a normal request stored earlier.

Figure 9:
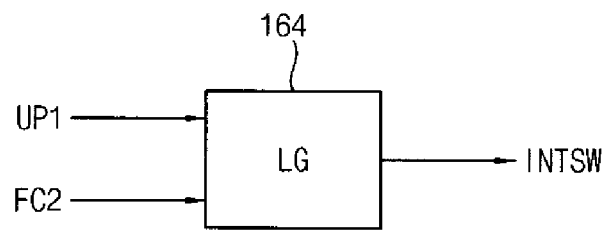
FIG. 9 is a diagram illustrating an example of a second control logic for an inter-node swapping operation of a register slicing circuit according to an example embodiment of the inventive concept.

FIG. 9 is a diagram illustrating an example of a second control logic 164 for an inter-node swapping operation of a register slicing circuit according to an example embodiment of the inventive concept.

Second control logic 164 may be included in control unit 160 of first register circuit 100 in FIG. 2. Second control logic 164 may be implemented with a logic gate configured to generate an inter-node swapping signal INTSW based on the first urgent flag UP1 and the second full count signal FC2. The first urgent flag is a flag included in the above-mentioned first request FRQ, that is, the request stored in first storage unit 101 of first request buffer 120. The second full count signal FC2 is provided from second register circuit 200 to indicate the issue-full state of second request buffer 220 in second register circuit 200. Second control logic 164 may activate the inter-node swapping signal INTSW only when both: the first urgent flag UP1 has the first value indicating that the corresponding request RQ1 is an urgent request; and the second full count signal FC is activated to indicate that second register circuit 200 is in an issue-full state. The inter-node swapping signal INTSW may be provided from first register circuit 100 to second register circuit 200 and first and second register circuits 100 and 200 may perform the above-described inter-node swapping operation in response to the inter-node swapping signal INTSW.

FIGS. 10A through 10F are diagrams illustrating an example sequence of an in-node swapping operation of a register slicing circuit according to an example embodiment of the inventive concept.

FIGS. 10A through 10F illustrate states of first request buffer 120 storing the requests at time points Ta through Tf, respectively. The time interval between the adjacent time point, e.g. between the time points Ta and Tb and between the time points Tb and Tc may correspond to a swapping period. OD indicates the above-mentioned order-dependency flag and UP indicates the above-mentioned urgent flag. U indicates an urgent request and N indicates a normal request. As illustrated in FIGS. 10A through 10F, it is assumed that the second and sixth requests RQ2 and RQ6 are urgent requests, and the third and sixth requests RQ3 and RQ6 form a group such that the service order of the third and sixth requests RQ3 and RQ6 are limited within the group. That is, it is assumed that the third request RQ3 has to be serviced earlier than the sixth request RQ6.

Figure 10A:
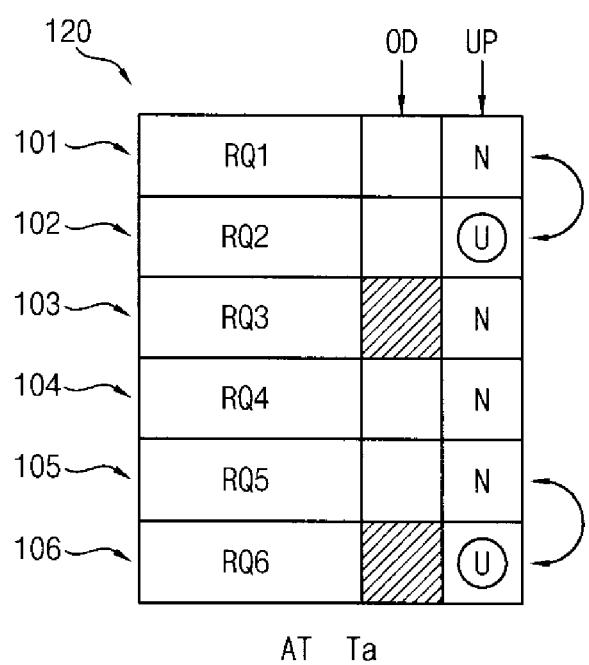
FIGS. 10A through 10F are diagrams illustrating an example sequence of an in-node swapping operation of a register slicing circuit according to an example embodiment of the inventive concept.
Figure 10B:
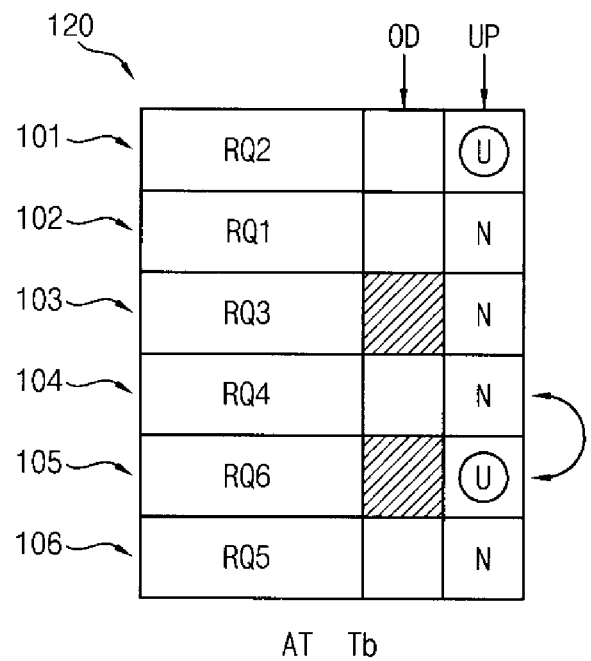
Figure 10C:
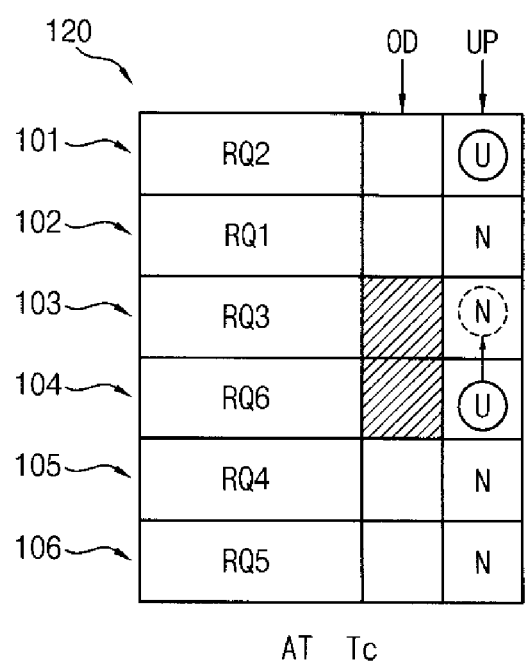
Figure 10D:
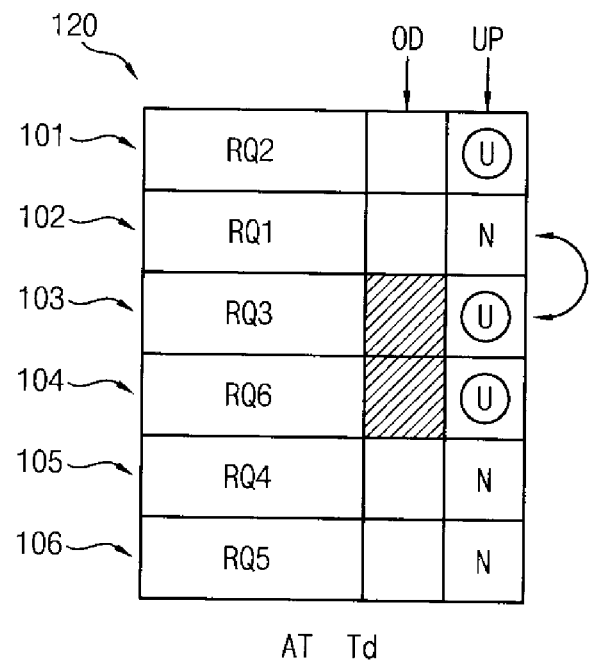
Figure 10E:
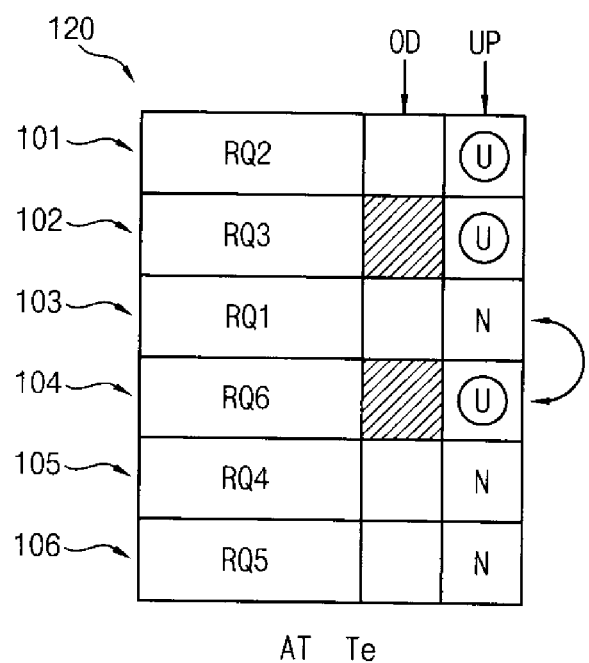
Figure 10F:
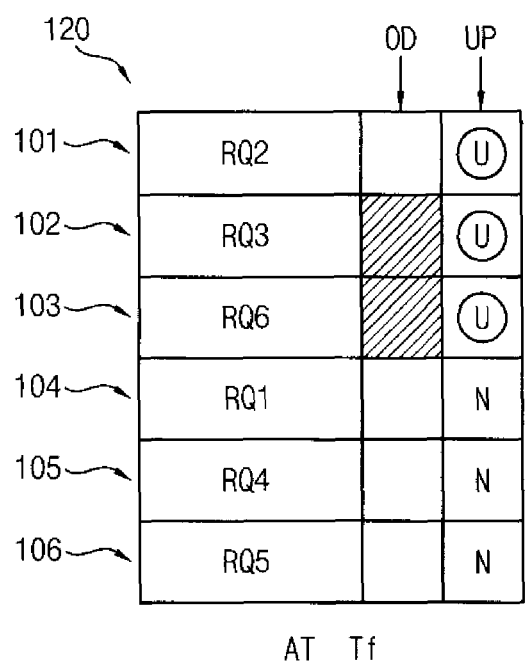

Referring to FIGS. 10A and 10B, the second request RQ2 corresponding to an urgent request is swapped with the first request RQ1 corresponding to a normal request, and the sixth request RQ6 corresponding to an urgent request is swapped with the fifth request RQ5 corresponding to a normal request, based on the respective urgent flags UP. Referring to FIGS. 10B and 10C, the sixth request RQ6 corresponding to the urgent request is swapped again with the fourth request RQ4 corresponding to a normal request. The second request RQ2 may not be swapped by the in-node swapping operation because the urgent request RQ2 is already stored in the most leading, or first, storage unit 101 in first request buffer 120. As described above, the request RQ2 in first storage unit 101 may be transferred to second register circuit 200 by the normal inter-node transfer, or the inter-node swapping operation. As illustrated in FIG. 10C, the third request RQ3 stored earlier is a normal request and the sixth request RQ6 stored later is an urgent request. The adjacent third and sixth requests RQ3 and RQ6 should normally be swapped according to the in-node swapping operation, but the in-node swapping may be inhibited due to the limit to the service order between the requests RQ3 and RQ6 in the group based on the order-dependency flags OD. In this case, the flow of the urgent request RQ6 may be retarded. Thus, the urgent flag of the third request RQ3 may be changed from the second value N indicating a normal request to the first value U indicating an urgent request as illustrated in FIG. 10D. Referring to FIGS. 10D and 10E, the third request RQ3 that has been changed to an urgent request is swapped with the first request RQ1 corresponding to a normal request. Referring to FIGS. 10E and 10F, the sixth request RQ6 corresponding to an urgent request is swapped with the first request RQ1 corresponding to a normal request.

As the in-node swapping operation of first register circuit 100 is described with reference FIGS. 10A through 10F, the in-node swapping operation of second register circuit 200 may be performed in the same way.

Each of first register circuit 100 and second register circuit 200 may determine, based on the order-dependency flags OD, a group of the requests the service order of which is limited within the group. When the group includes an urgent request stored later and a normal request stored earlier, the urgent flag of a normal request stored earlier may be changed from the second value N to the first value U to effectively change the normal request into an urgent request.

As such, if there is a limit to the service order between the requests, the retardation of the flow of the urgent request may be prevented by changing the normal request stored earlier to the urgent request.

FIG. 11 is a diagram illustrating a system on chip (SOC) according to example embodiments of the inventive concept.

Referring to FIG. 11, an SOC 1000 may include a plurality of master devices (MASTERi, i=1, 2, 3, 4) 31, 32, 33 and 34, a plurality of slave devices (SLAVEj, j=1, 2, 3) 41, 42 and 43, and an interconnect device 800. The master devices and/or slave devices may also be referred to as IP cores or IP blocks. While FIG. 11 shows three slaves and four masters, this is merely one example, as the inventive concept is not limited to any particular number of slaves or masters.

Master devices 31, 32, 33 and 34 may generate requests to demand services from at least one of slave devices 41, 42 and 43, respectively. Master devices 31, 32, 33 and 34 may generate, in real time, urgent information and priority information indicating service requirement levels of respective master devices 31, 32, 33 and 34.

Master devices 31, 32, 33 and 34 and slave devices 41, 42 and 43 may be coupled to interconnect device 800 through respective channels. Interconnect device 800 may perform an arbitrating operation on the requests based on the priority information and may control request flows between master devices 31, 32, 33 and 34 and slave devices 41, 42 and 43 based on the urgent information.

Interconnect device 800 includes at least one register slicing circuit (RSC) 500 as described with reference to FIGS. 1 through 10F, and register slicing circuit 500 may be inserted in an arbitrary path between master devices 31, 32, 33 and 34 and slave devices 41, 42 and 43. In an example embodiment, a plurality of register slicing circuits of the same or similar configuration may be included in interconnect device 800.

As described above, register slicing circuit 500 may expedite the flow of the urgent requests between the network nodes spaced apart from each other with a relatively long distance, through the in-node operation and the inter-node swapping operations using the backward channel. In addition, if there is a limit to the service order between requests, the retardation of the flow of an urgent request may be prevented by changing a normal request stored earlier to an urgent request.

Figure 12:
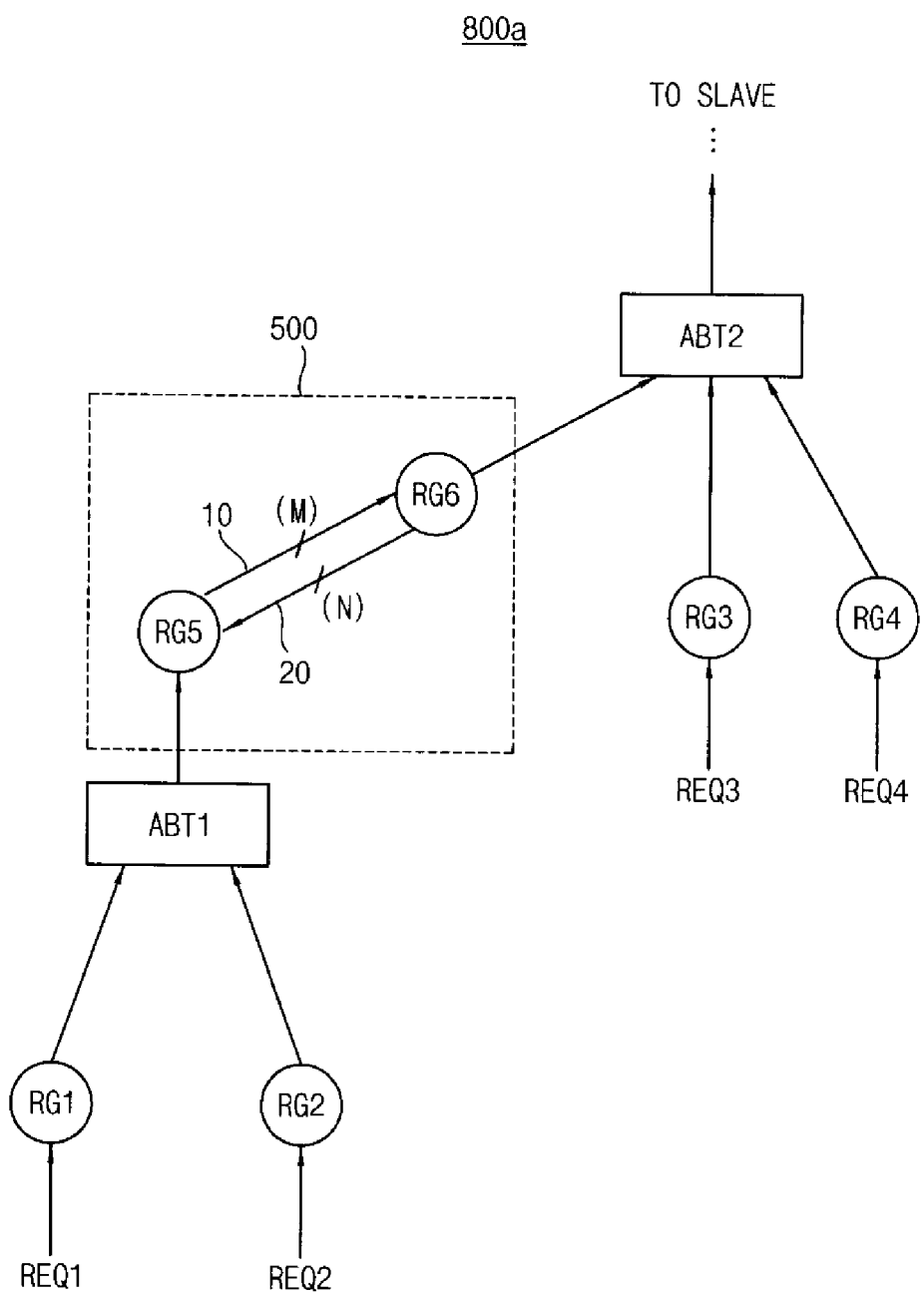
FIG. 12 is a diagram illustrating an interconnect device adopting a register slicing circuit according to an example embodiment of the inventive concept.

FIG. 12 is a diagram illustrating an interconnect device adopting a register slicing circuit according to an example embodiment of the inventive concept.

Referring to FIG. 12, an interconnect device 800a may have a multi-layered architecture for transferring a plurality of requests REQ1, REQ2, REQ3 and REQ4 from respective master devices to a common slave device through a plurality of arbitration points ABT1 and ABT2.

Respective arbiter circuits may be disposed in the arbitration points ABT1 and ABT2 on which the two or more requests converge. The arbiter circuit may transfer requests one by one toward the slave device based on the priorities and/or the urgent flags of the competing requests. As illustrated in FIG. 12, for timing closure, slicing nodes RG1 through RG6 may be disposed at proper portions in interconnect device 800a. Each of the slicing nodes RG1 through RG6 may have a configuration to support multiple outstanding requests. For example, above-described register circuit 100 may be included in each of the slicing nodes RG1 through RG6.

Each of the slicing nodes RG1 through RG6 may perform the above-described in-node swapping operation. In addition, register slicing circuit 500 may include the slicing nodes RG5 and RG6 that are coupled through forward channel 10 and backward channel 20 to perform the inter-node swapping operation. As described above, the number N of the signal lines in backward channel 20 may be less than the number M of the signal lines in forward channel 10. In this case, as described with reference to FIGS. 5A through 5E, the request RQ3 sent back through backward channel 20 may be divided into the segments RQ3a, RQ3b and RG3c, and the segments RQ3a, RQ3b and RG3c may be sent back sequentially through backward channel 20 from the slicing node RG6 to the slicing node RG5.

Register slicing circuit 500 may efficiently expedite the flows of the urgent requests without excessively demoting the flows of the normal requests. Also the design burden of the complex SOC may be reduced by determining the proper number of signal lines in backward channel 20.

A master device or the master intellectual property core or block (IP) may be divided into a hard realtime IP, a soft realtime IP, and a best effort IP, etc. depending on the type or the operational characteristic of the master IP.

The hard realtime IP may be an IP such as a display device that consumes data steadily and thus requires a necessary bandwidth. An underrun of a data buffer in the hard realtime IP may be caused if the necessary bandwidth is not satisfied. The hard realtime IP buffers the serviced data sufficiently in the data buffer if the necessary bandwidth is satisfied and controls the request flow itself such that the hard realtime IP issues the request according to the amount of the consumed data.

To reduce manufacturing cost, an external modem chip may share a memory in the SOC. Such an external modem chip may not operate normally if an average latency requirement level is not satisfied. It may be difficult to determine and fix the average latency requirement level because the type of the modem chip varies.

The soft realtime IP may be an IP such as a video codec that requires an average operation time. The video codec may have a frame rate such as 30 or 60 frames per second and may require an average decode/encode time. The bandwidth requirement level of the video codec may be changed according to respective frames and the video codec may require an average encoding time and/or an average decoding time. The video codec tends to proceed with the encoding/decoding of the next frame as soon as possible if the request flow is not controlled but the issue of the requests is limited due to dependency between the previously and currently processed data. Thus the operation speed of the video codec may satisfy the determined frame rate if the required bandwidth and/or latency are secured, but the operation speed of the codec may be sharply decreased if the latency becomes greater than a threshold value.

The best effort IP may be an IP such as two-dimensional or a three-dimensional graphics engine that issues requests endlessly if the request flow is not controlled and thus request flow control is needed in the best effort IP. It is desirable to support maximum service requirement levels of the best effort IP if one or more other IPs of higher priority than the best effort IP is/are not in the urgent state. If another IP is in the urgent state, the request flow from the best effort IP is limited so that the other IP of the higher priority may exit from the urgent state.

The latency-oriented IP such as a central processing unit (CPU) may have a variable bandwidth requirement level depending on the situation but its performance is directly influenced by an average latency. The request flow of the latency-oriented IP needs to be controlled based on the latency because the average bandwidth requirement level may not be defined.

According to such characteristics of the master IPs, the priority information and/or the urgent information of the respective master IPs may be provided to control the request flows.

Figure 13:
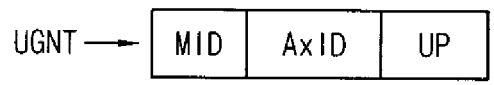
FIG. 13 is a diagram illustrating an example structure of urgent information used in an SOC according to an example embodiment of the inventive concept.

FIG. 13 is a diagram illustrating an example structure of urgent information used in an SOC according to an example embodiment of the inventive concept.

Referring to FIG. 13, the urgent information UGNT may include a master identifier MID indicating the master device that issued the corresponding request, a request identifier AxID for distinguishing the requests, and an urgent flag UP. As described below with reference to FIG. 14, the urgent information may be propagated into the interconnect device independently of the request flows, and the urgent flags in the requests, which are issued before and stored in the interconnect device may be upgraded in real time based on the corresponding urgent information UGNT.

Figure 14:
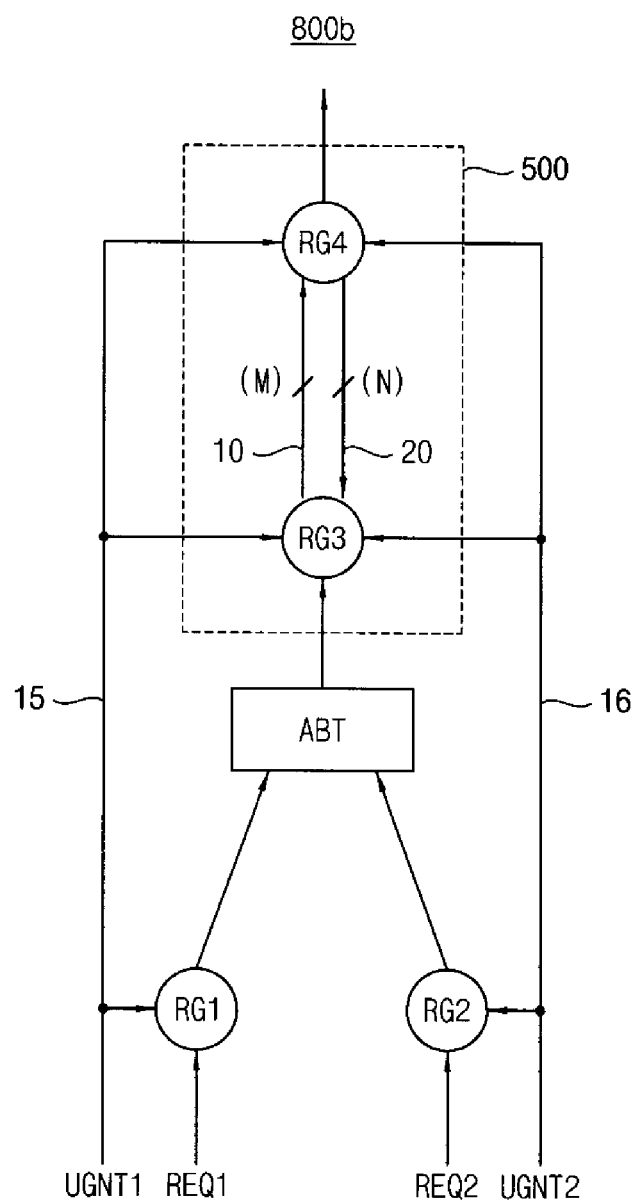
FIG. 14 is a diagram illustrating an interconnect device adopting a register slicing circuit according to an example embodiment of the inventive concept.

FIG. 14 is a diagram illustrating an interconnect device 800b adopting a register slicing circuit according to an example embodiment of the inventive concept.

Referring to FIG. 14, interconnect device 800b may include at least one arbitration point ABT and a plurality of slicing nodes RG1, RG2, RG3 and RG4. As described above, register slicing circuit 500 may be implemented at the proper position in interconnect device 800b.

As described with reference to FIG. 13, urgent information UGNT1 and UGNT2 may indicate the urgency of the corresponding requests REQ1 and REQ2, and the urgent information UGNT1 and UGNT2 may be transferred to interconnect device 800b in real time. Based on the urgent information UGNT1 and UGNT2, the urgent flags stored in the slicing nodes RG1, RG2, RG3 and RG4 may be upgraded in real time.

Figure 15:
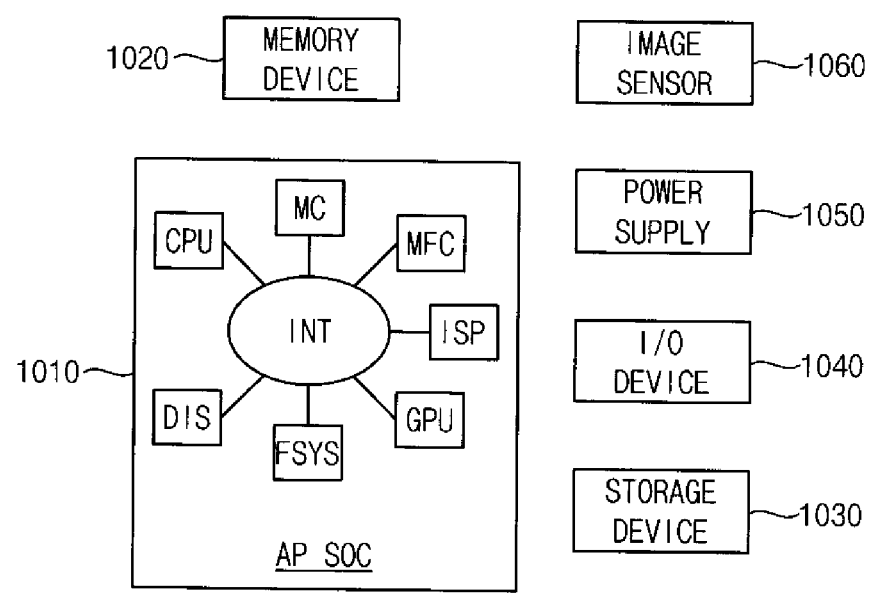
FIG. 15 is a block diagram illustrating a computing system including a system on chip according to an example embodiment of the inventive concept.

FIG. 15 is a block diagram illustrating a computing system or electronic system 2000 including a system on chip according to an example embodiment of the inventive concept.

Referring to FIG. 15, system 2000 includes a system on chip (SOC), a memory device 1020, a storage device 1030, an input/output (I/O) device 1040, a power supply 1050 and an image sensor 1060. Although it is not illustrated in FIG. 15, system 2000 may further include ports that communicate with a video card, a sound card, a memory card, a USB device, or other electronic devices.

SOC 1010 may be an application processor (AP) SOC including an interconnect device INT and a plurality of intellectual property cores or blocks (IPs) coupled to the interconnect device INT as described with reference to FIGS. 1 through 14. As illustrated in FIG. 15, the IPs may include a memory controller MC, a central processing unit CPU, a display controller DIS, a file system block FSYS, a graphic processing unit GPU, an image signal processor ISP, a multi-format codec block MFC, etc. For example, the memory controller MC may correspond to the above-described slave device and other IPs may correspond to the above-described master devices that use the memory controller MC as a common resource. Even though not specifically illustrated in FIG. 15, the interconnect device INT in SOC 1010 may include the above-described register slicing circuit.

SOC 1010 may communicate with memory device 1020, storage device 1030, input/output device 1040 and image sensor 1060 via a bus such as an address bus, a control bus, and/or a data bus. In at least one example embodiment, SOC 1010 is coupled to an extended bus, such as a peripheral component interconnection (PCI) bus.

Memory device 1020 may store data for operating the system 2000. For example, memory device 1020 may be implemented with a dynamic random access memory (DRAM) device, a mobile DRAM device, a static random access memory (SRAM) device, a phase random access memory (PRAM) device, a ferroelectric random access memory (FRAM) device, a resistive random access memory (RRAM) device, and/or a magnetic random access memory (MRAM) device. Storage device 1030 may include a solid state drive (SSD), a hard disk drive (HDD), a CD-ROM, etc. Input/output device 1040 may include an input device (e.g., a keyboard, a keypad, a mouse, etc.) and an output device (e.g., a printer, a display device, etc.). Power supply 1050 supplies operation voltages for system 2000.

Image sensor 1060 may communicate with SOC 1010 via the buses or other communication links. As described above, image sensor 1060 may be integrated with SOC 1010 in one chip, or image sensor 1060 and SOC 1010 may be implemented as separate chips.

The components in system 2000 may be packaged in various forms, such as package on package (PoP), ball grid arrays (BGAs), chip scale packages (CSPs), plastic leaded chip carrier (PLCC), plastic dual in-line package (PDIP), die in waffle pack, die in wafer form, chip on board (COB), ceramic dual in-line package (CERDIP), plastic metric quad flat pack (MQFP), thin quad flat pack (TQFP), small outline IC (SOIC), shrink small outline package (SSOP), thin small outline package (TSOP), system in package (SIP), multi chip package (MCP), wafer-level fabricated package (WFP), or wafer-level processed stack package (WSP).

System 2000 may comprise any computing system including at least one SOC. For example, system 2000 may include a digital camera, a mobile phone, a smart phone, a portable multimedia player (PMP), a personal digital assistant (PDA), a tablet computer, etc.

FIG. 16 is a block diagram illustrating one or more interfaces employable with system 2000 of FIG. 15 according to an example embodiment of the inventive concept.

Referring to FIG. 16, a computing system 1100 may be implemented by a data processing device that uses or supports mobile industry processor interface (MIPI). Computing system 1100 may include SOC 1110 in a form of an application processor (AP), an image sensor 1140, a display device 1150, etc. SOC 1110 may include an interconnect device and service controllers as described above according to example embodiments.

A camera serial interface (CSI) host 1112 of SOC 1110 may perform a serial communication with a CSI device 1141 of the image sensor 1140 via a camera serial interface. In an example embodiment, CSI host 1112 may include a deserializer (DES), and CSI device 1141 may include a serializer (SER). A display serial interface (DSI) host 1111 of SOC 1110 may perform a serial communication with a DSI device 1151 of the display device 1150 via a display serial interface.

In an example embodiment, DSI host 1111 may include a serializer (SER), and DSI device 1151 may include a deserializer (DES). Computing system 1100 may further include a radio frequency (RF) chip 1160 performing a communication with SOC 1110. A physical layer (PHY) 1113 of computing system 1100 and a physical layer (PHY) 1161 of RF chip 1160 may perform data communications based on a MIPI DigRF. SOC 1110 may further include a DigRF master 1114 that controls the data communications of the physical layer PHY 1113.

Computing system 1100 may further include a global positioning system (GPS) block 1120, storage 1170, a microphone MIC 1180, DRAM device 1185, and a speaker 1190. In addition, computing system 1100 may perform communications using an ultra wideband (UWB) block 1210, a wireless local area network (WLAN) block 1220, a worldwide interoperability for microwave access (WIMAX) block 1230, etc. However, the structure and the interface of system 1100 may not be limited thereto.

A register slicing circuit according to at least one example embodiment of the inventive may be efficiently used in connecting master devices to at least one slave device which is commonly accessed by the master devices. At least one of the example embodiments may be applied to an SOC in which various semiconductor components are integrated as one chip. According to at least one example embodiment of the inventive concept, request flows may be controlled efficiently in systems such a digital camera, a mobile phone, a PDA, APMT, a smart phone, etc. requiring a smaller size, a higher performance and a higher operational speed.

The foregoing is illustrative of example embodiments and is not to be construed as limiting thereof. Although a few example embodiments have been described, those skilled in the art will readily appreciate that many modifications are possible in the example embodiments without materially departing from the novel teachings and advantages of the present inventive concept. Accordingly, all such modifications are intended to be included within the scope of the present inventive concept as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. A register slicing circuit, comprising:
   first and second register circuits configured to sequentially store requests received from a plurality of master devices to output the stored requests toward a slave device;
   a forward channel configured to send a first request from the first register circuit to the second register circuit; and
   a backward channel configured to send back a second request from the second register circuit to the first register circuit,
   wherein the requests each include a corresponding urgent flag, each urgent flag indicating whether or not an urgent service of the corresponding request is required such that a request having the urgent flag of a first value corresponds to an urgent request and a request having the urgent flag of a second value corresponds to a normal request, and
   wherein the first register circuit and the second register circuit are configured to perform an inter-node swapping operation based on the urgent flags for exchanging the first request and the second request.

2. The register slicing circuit of claim 1, wherein a number of signal lines in the backward channel for sending back the second request is less than a number of signal lines in the forward channel for sending the first request.

3. The register slicing circuit of claim 2, wherein the second register circuit is configured to divide the second request into a plurality of segments and to send back the segments sequentially through the backward channel to the first register circuit.

4. The register slicing circuit of claim 1, wherein the inter-node swapping operation is performed when both: the second register circuit is in an issue-full state in which the second register circuit stores a maximum number of the requests; and the first request corresponds to an urgent request.

5. The register slicing circuit of claim 4, wherein the first register circuit and the second register circuit are configured to cancel the inter-node swapping operation when the second register circuit is relieved from the issue-full state before the inter-node swapping operation is completed.

6. The register slicing circuit of claim 1, wherein each of the first register circuit and the second register circuit is configured to perform an in-node swapping operation based on the urgent flags for exchanging a storing order of two requests adjacently stored in each of the first register circuit and the second register circuit such that an urgent request stored later is exchanged with a normal request stored earlier.

7. The register slicing circuit of claim 6, wherein the requests each further include an order-dependency flag, the order-dependency flags indicating a limitation of a service order between two or more of the requests, and
   wherein each of the first register circuit and the second register circuit is configured to determine, based on the order-dependency flags, a group of the requests the service order of which is limited within the group, and configured to, when the group includes an urgent request stored later and a normal request stored earlier, change the urgent flag of the normal request stored earlier from the second value to the first value.

8. The register slicing circuit of claim 1, wherein each of the first register circuit and the second register circuit comprises:
a request buffer configured to store the requests;
a backward buffer configured to temporarily store the second request to be sent back during the inter-node swapping operation; and
a control unit configured to control the request buffer and the backward buffer.

9. The register slicing circuit of claim 8, wherein the control unit of the second register circuit is configured to provide a full count signal to the first register circuit, the full count signal indicating an issue-full state in which the second register circuit stores a maximum number of the requests, and
wherein the control unit of the first register circuit is configured to determine whether to perform the inter-node swapping operation based on the full count signal from the second register circuit, and the urgent flag in the first request.

10. A system on chip (SOC) comprising:
a slave device:
a plurality of master devices configured to generate requests to demand services from the slave device, respectively; and
an interconnect device coupling the slave device and the master devices, the interconnect device comprising:
first and second register circuits configured to sequentially store the requests received from the master devices to output the stored requests toward the slave device;
a forward channel configured to send a first request from the first register circuit to the second register circuit; and
a backward channel configured to send back a second request from the second register circuit to the first register circuit,
wherein the requests each include a corresponding urgent flag, each urgent flag indicating whether or not an urgent service of the corresponding request is required such that a request having the urgent flag of a first value corresponds to an urgent request and a request having the urgent flag of a second value corresponds to a normal request, and
wherein the first register circuit and the second register circuit are configured to perform an inter-node swapping operation based on the urgent flags, the inter-node swapping operation for exchanging the first request and the second request.

11. The SOC of claim 10, wherein the first register circuit and the second register circuit are further configured to perform an in-node swapping operation based on the urgent flags, in-node swapping operation for exchanging a storing order of two requests adjacently stored in each of the first register circuit and the second register circuit such that an urgent request stored later is exchanged with a normal request stored earlier.

12. The SOC of claim 10, wherein urgent information indicating requirements of the urgent services of the respective requests is provided in real time from the master devices to the first register circuit and the second register circuit, and the values of the urgent flags in the request stored in the first register circuit and the second register circuit are upgraded in real time based on the urgent information.

13. A device, comprising:
a first register circuit having a first request buffer comprising a first plurality of storage units connected together in a shift register configuration, the first plurality of storage units being configured to store therein a plurality of requests, including requests having at least two different levels of urgency than each other; and
a second register circuit connected to the first register circuit by a forward channel which is configured to send the requests from the first register circuit to the second register circuit, and a backward channel which is configured to send the requests from the second register circuit back to the second register circuit, the second register circuit comprising:
a second request buffer comprising a second plurality of storage units connected together in the shift register configuration, the second plurality of storage units being configured to receive the requests from the first register circuit via the forward channel and to store the requests therein, including the requests having the at least two different levels of urgency;
a backward buffer configured to receive and temporarily store at least one of the requests from the second plurality of storage units to be sent back to the first resister circuit via the backward channel; and
a control unit configured to control operations of the second register circuit.

14. The device of claim 13, wherein the control unit outputs to the first register circuit a full count signal which indicates whether the second plurality of storage units are all occupied with requests.

15. The device of claim 13, wherein the control unit is configured to control the second register circuit to divide each of at least one of the requests stored in the backward buffer into a plurality of segments and to send back the segments sequentially through the backward channel to the first register circuit.

16. The device of claim 13, wherein the requests each include a corresponding urgent flag, each urgent flag indicating an urgency of the corresponding request, wherein the urgent flag having a first value indicates an urgent request and the urgent flag having a second value indicates a normal request, wherein the device is configured to perform an inter-node swapping operation based on the urgent flags for exchanging an urgent request stored in the first plurality of storage units of the first register circuit with a normal request stored in the second plurality of storage units of the second register circuit by sending the normal request from the backward buffer of the second register circuit to the first register circuit via the backward channel.

17. The device of claim 16, wherein the inter-node swapping operation is performed when both: the second register circuit is in an issue-full state in which the second register circuit stores a maximum number of the requests; and the urgent request is stored in the first plurality of storage units.

* * * * *